UNITED STATES PATENT OFFICE.

JEREMIAH FLYNN, OF SYRACUSE, NEW YORK.

COMPOSITION FOR ARCHITECTURAL PURPOSES.

SPECIFICATION forming part of Letters Patent No. 503,592, dated August 22, 1893.

Application filed March 20, 1893. Serial No. 466,895. (No specimens.)

*To all whom it may concern:*

Be it known that I, JEREMIAH FLYNN, of Syracuse, in the county of Onondaga, in the State of New York, have invented new and useful Improvements in Compositions for Architectural Purposes, of which the following is a full, clear, and exact description.

This invention consists in an improved composition of various materials designed to be converted into mortar for plastering the inside or outside of buildings and which, when set, forms a very hard, tenacious and durable coat.

The salient feature of novelty of the composition is the retarder used in connection with other ingredients which form the mortar proper, the purpose of said retarder being to delay the setting of the mortar sufficiently to afford ample time for thoroughly mixing it and properly spreading it upon the wall or ceiling of the building. Said retarder is composed of the following ingredients, to wit: two (2) pounds of potash, six (6) gallons of water and forty (40) pounds of glue. These ingredients are to be thoroughly mixed to form a solution which is then mixed with a sufficient quantity of quick-lime to become absorbed therein and form a hard dry mass, which is subsequently ground into a pulverous condition. This dry compound may be put up in sacks or barrels or other suitable packages for storing or transporting the same to the consumer. For preparing a mortar suitable for what is termed a scratch-coat or first coat of plastering, I mix said dry compound with the following materials in about the porportions set opposite the same, to wit: sand, seven hundred and sixty pounds; plaster of paris, two hundred and eighty pounds; water lime, one hundred pounds; slaked quick-lime, one hundred and twenty-five pounds; talc, ten pounds, and mineral pulp ten pounds; the before described retarder, twenty-five pounds; vegetable fiber, three pounds. These ingredients are to be thoroughly mixed and then converted into mortar by the addition of the requisite amount of water.

For a second or finishing coat I prepare the mortar of the following ingredients and in the following manner, to wit: sand or marble dust, two hundred and sixty pounds; plaster of paris, three hundred and fifty pounds; slaked quick-lime, one hundred and forty pounds; the before stated retarder, thirty pounds; talc, ten pounds, and mineral pulp ten pounds, all of which are to be thoroughly mixed together and then made into a mortar of the proper consistency by the addition of water.

What I claim as my invention is—

The composition of matter for plastering material consisting of sand or marble dust, plaster of paris, slaked quick lime, talc, mineral pulp and a solution of carbonate of potash and glue absorbed in quick lime in about the proportions set forth.

In testimony whereof I have hereunto signed my name this 18th day of March, 1893.

JEREMIAH FLYNN. [L. S.]

Witnesses:
C. L. BENDIXON,
J. J. SAASS.